United States Patent
Ertz et al.

(10) Patent No.: US 9,140,194 B2
(45) Date of Patent: Sep. 22, 2015

(54) GAS TURBINE ENGINE STARTER-GENERATOR WITH INTEGRATED LUBE OIL SCAVENGE FUNCTIONALITY

(75) Inventors: Timothy Ertz, Scottsdale, AZ (US); Gregory Geyer, Phoenix, AZ (US); Thomas Nesdill, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 725 days.

(21) Appl. No.: 13/348,166

(22) Filed: Jan. 11, 2012

(65) Prior Publication Data

US 2013/0174575 A1 Jul. 11, 2013

(51) Int. Cl.
*F01D 25/18* (2006.01)
*F01D 25/20* (2006.01)
*F02C 7/275* (2006.01)
*F02C 7/06* (2006.01)
*F02C 7/268* (2006.01)
*F01D 25/16* (2006.01)
*F02C 7/14* (2006.01)
*F02C 7/32* (2006.01)
*F02C 7/277* (2006.01)

(52) U.S. Cl.
CPC .............. *F02C 7/275* (2013.01); *F01D 25/18* (2013.01); *F01D 25/20* (2013.01); *F02C 7/06* (2013.01); *F01D 25/16* (2013.01); *F02C 7/14* (2013.01); *F02C 7/268* (2013.01); *F02C 7/277* (2013.01); *F02C 7/32* (2013.01); *F05D 2220/76* (2013.01); *Y02T 50/671* (2013.01)

(58) Field of Classification Search
CPC .............. F02C 7/26; F02C 7/32; F02C 7/06; F02C 7/14; F02C 7/275; F02K 9/95; F01D 25/18; F01D 25/20; F01D 25/16; F01D 25/125

USPC .......... 60/39.08, 786, 788, 802; 184/6.11, 6.2
See application file for complete search history.

(56) References Cited

U.S. PATENT DOCUMENTS

| | | | |
|---|---|---|---|
| 4,144,950 A * | 3/1979 | Moyer et al. ............... | 184/6.11 |
| 4,891,934 A * | 1/1990 | Huelster ..................... | 60/39.08 |
| 5,177,968 A | 1/1993 | Fellows | |
| 5,435,912 A | 7/1995 | Baehler et al. | |
| 5,555,722 A * | 9/1996 | Mehr-Ayin et al. ........... | 60/788 |
| 5,567,306 A * | 10/1996 | DeWachter ............. | 210/167.02 |
| 6,035,626 A * | 3/2000 | Wahl et al. ..................... | 60/773 |
| 7,055,303 B2 | 6/2006 | Macfarlane et al. | |
| 7,500,365 B2 | 3/2009 | Suciu et al. | |
| 7,506,724 B2 * | 3/2009 | Delaloye ....................... | 184/6.2 |
| 7,603,839 B2 * | 10/2009 | Dooley ........................ | 60/39.08 |

(Continued)

FOREIGN PATENT DOCUMENTS

GB 551516 10/1941

*Primary Examiner* — Phutthiwat Wongwian
*Assistant Examiner* — Alain Chau
(74) *Attorney, Agent, or Firm* — Ingrassia Fisher & Lorenz, P.C.

(57) ABSTRACT

A gas turbine engine starter-generator includes a housing assembly, a motor-generator, and a lubricant pump. The housing assembly includes a lubricant inlet port for receiving a flow of lubricant. The motor-generator is disposed within the housing assembly and is adapted to be coupled to an auxiliary power unit. The motor-generator is configured to selectively operate in either a motor mode or a generator mode. The lubricant pump is disposed within the housing assembly and includes one or more pump inlets and one or more pump outlets.

9 Claims, 1 Drawing Sheet

(56) References Cited

U.S. PATENT DOCUMENTS

| | | |
|---|---|---|
| 7,687,928 B2 | 3/2010 | Taneja et al. |
| 7,805,947 B2 * | 10/2010 | Moulebhar ................ 60/787 |
| 2003/0059294 A1 * | 3/2003 | Olsen ...................... 415/110 |
| 2008/0236951 A1 * | 10/2008 | Alecu et al. .............. 184/6.11 |
| 2008/0250792 A1 | 10/2008 | Wang et al. |
| 2009/0014245 A1 * | 1/2009 | Shevchenko et al. ......... 184/6.4 |
| 2009/0101444 A1 * | 4/2009 | Alecu ..................... 184/11.2 |
| 2009/0123274 A1 * | 5/2009 | Chaudhry ................ 415/182.1 |
| 2009/0235632 A1 | 9/2009 | Pisseloup |
| 2010/0019505 A1 | 1/2010 | Frost |
| 2010/0300117 A1 | 12/2010 | Moulebhar |
| 2011/0030385 A1 * | 2/2011 | Ellans et al. ................ 60/786 |
| 2011/0203249 A1 * | 8/2011 | Telakowski ............... 60/39.08 |
| 2012/0006151 A1 * | 1/2012 | DeDe et al. .............. 74/606 R |

* cited by examiner

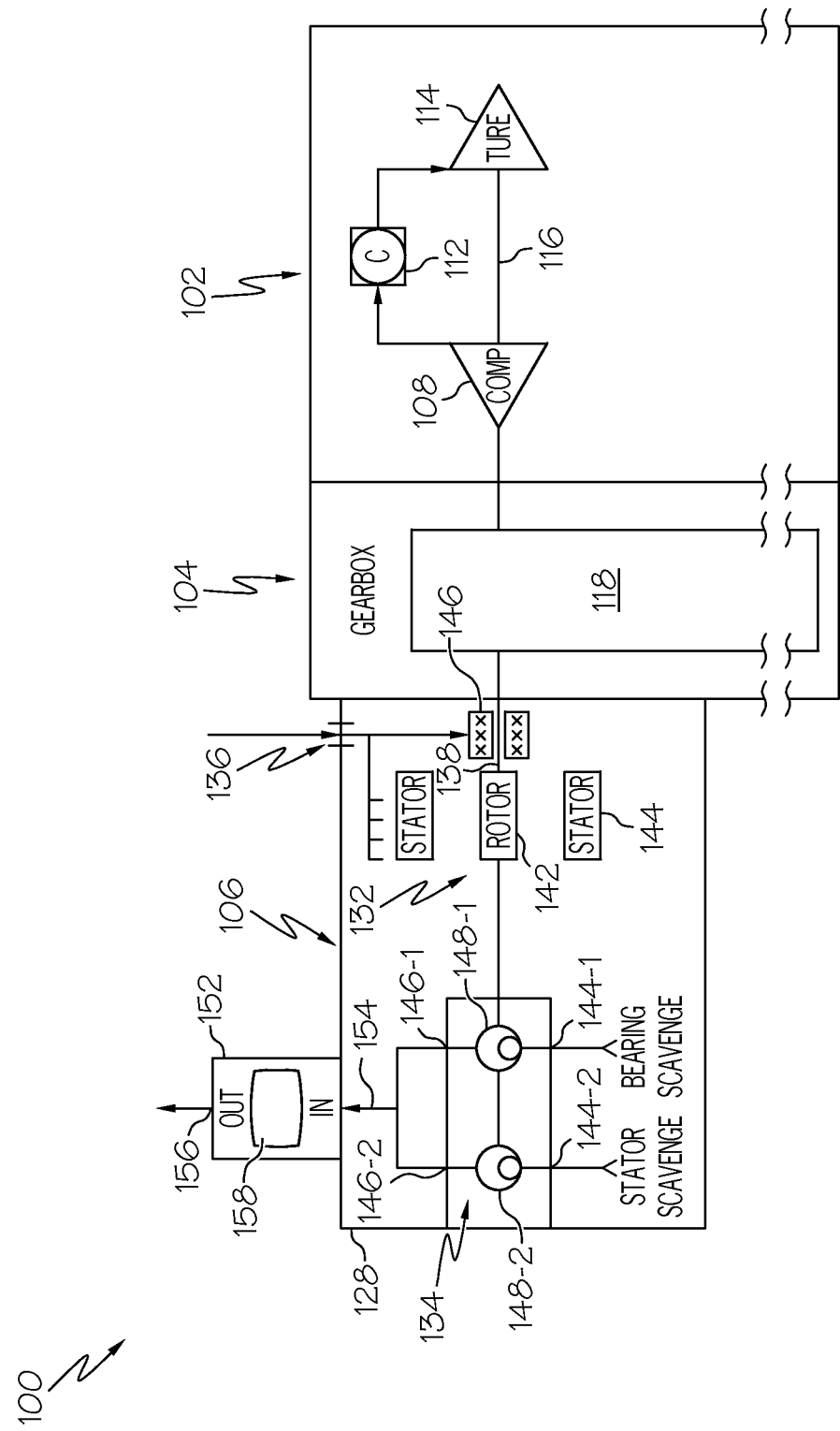

GAS TURBINE ENGINE STARTER-GENERATOR WITH INTEGRATED LUBE OIL SCAVENGE FUNCTIONALITY

TECHNICAL FIELD

The present invention generally relates to gas turbine engine starter-generators, and more particularly relates to a gas turbine engine starter-generator with an integrated lube oil scavenge function.

BACKGROUND

Gas turbine engines are used in myriad environments for myriad uses. For example, many aircraft include gas turbine engines to function as the main propulsion engines. The main propulsion engines, in many aircraft, not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include one or more additional gas turbine engines to function as auxiliary power units (APUs). An APU, when operational, supplements the main propulsion engines in providing electrical and/or pneumatic power.

No matter its specific end-use environment or function, a gas turbine engine may include a rotatable drive shaft that is connected to a gear train housed in a gearbox for transferring force to and from the drive shaft. The gearbox can define various interfaces for various accessories to be mounted on the gearbox. These accessories may include, for example, a starter-generator, a fuel control component, and a lubrication pump.

As with numerous other rotating machines, the starter-generator needs to be supplied with lubrication. This can increase lubrication pump weight and complexity, since additional scavenge elements may need to be provided in order to scavenge lubricant from the starter-generator. This may also require additional filtration components to filter the scavenged lubricant, as well as additional gearbox coring to connect all of the relevant interfaces. All of these considerations can increase overall system weight, cost, and complexity.

Hence, there is a need for a means to reduce overall system weight, cost, and complexity, while providing adequate lubrication and scavenging functions for a gas turbine engine starter-generator. The present invention addresses at least this need.

BRIEF SUMMARY

In one embodiment, a gas turbine engine starter-generator includes a housing assembly, a motor-generator, and a lubricant pump. The housing assembly includes a lubricant inlet port for receiving a flow of lubricant. The motor-generator is disposed within the housing assembly and is adapted to be coupled to an auxiliary power unit. The motor-generator is configured to selectively operate in either a motor mode, in which a portion of the motor-generator rotates in response to being electrically energized, and a generator mode, in which a portion of the motor-generator rotates in response to being supplied with an input torque. The lubricant pump is disposed within the housing assembly and includes one or more pump inlets and one or more pump outlets. The lubricant pump is coupled to the motor-generator and is configured, upon rotation thereof, to draw lubricant into the one or more pump inlets and discharge lubricant out of the one or more pump outlets.

In another embodiment, a system includes a gas turbine engine, and a starter-generator. The gas turbine engine includes a rotationally mounted drive shaft. The starter-generator is coupled to the gas turbine engine and includes a housing assembly, a motor-generator, and a lubricant pump. The housing assembly is coupled to the gas turbine engine and includes a lubricant inlet port for receiving a flow of lubricant. The motor-generator is disposed within the housing assembly and is coupled to the drive shaft. The motor-generator is configured to selectively operate in either a motor mode, in which the motor-generator generates and supplies an output torque to the drive shaft in response to being electrically energized, and a generator mode, in which the motor-generator receives an input torque from the drive shaft and generates electrical power. The lubricant pump is disposed within the housing assembly and includes one or more pump inlets and one or more pump outlets. The lubricant pump is coupled to the motor-generator and is configured, upon rotation of the motor-generator, to draw lubricant into the one or more pump inlets and discharge lubricant out of the one or more pump outlets.

In yet another embodiment, a system includes a gas turbine engine, a starter-generator, and a gearbox. The gas turbine engine includes a rotationally mounted drive shaft. The starter-generator is coupled to the gas turbine engine, and the gearbox is disposed between, and is coupled to, the gas turbine engine and the starter-generator. The starter-generator includes a housing assembly, a motor-generator, a lubricant pump, and a filter housing. The housing assembly is coupled to the gearbox and includes a lubricant inlet port for receiving a flow of lubricant. The motor-generator is disposed within the housing assembly and is coupled to the drive shaft via the gearbox. The motor-generator is configured to selectively operate in either a motor mode, in which the motor-generator generates and supplies an output torque to the drive shaft in response to being electrically energized, and a generator mode, in which the motor-generator receives an input torque from the drive shaft and generates electrical power. The lubricant pump is disposed within the housing assembly and includes one or more pump inlets and one or more pump outlets. The lubricant pump is coupled to the motor-generator and is configured, upon rotation of the motor-generator, to draw lubricant into the one or more pump inlets and discharge lubricant out of the one or more pump outlets. The filter housing is coupled to the housing assembly and includes a filter inlet and a filter outlet. The filter inlet is in fluid communication with the pump outlet to receive lubricant discharged therefrom.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 1 is a schematic diagram depicting a gas turbine engine system including a starter-generator having an integrated lubricant pump.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

With reference now to FIG. 1, a schematic diagram of an exemplary aircraft gas turbine engine system 100 is depicted, and includes a gas turbine engine 102, a gearbox 104, and a starter-generator 106. The gas turbine engine 102 includes a compressor 108, a combustor 112, and a turbine 114. During operation of the gas turbine engine 102, the compressor 108 draws in ambient air, compresses the ambient air, and supplies the compressed air to at least the combustor 112. In some embodiments, compressed air may also be supplied to a non-illustrated bleed air outlet port.

The combustor 112 receives the compressed air from the compressor 108, and also receives a flow of fuel from a non-illustrated fuel source. The fuel and compressed air are mixed within the combustor 112, and are ignited to produce relatively high-energy combustion gas, which is supplied to the turbine 114. The high-energy combustion gas expands through the turbine 114, impinging on non-illustrated turbine blades and causing the turbine 114 to rotate. The turbine 114 includes an output shaft 116 that drives the compressor 108, and that is also coupled to the gearbox 104.

The gearbox 104 houses a gear train 118, which is coupled to the output shaft 116 and to one or more accessories mounted on or within the gearbox 104. The number and type of accessories may vary, and may include, for example, a non-illustrated lubrication pump, and a non-illustrated fuel control unit. As may be appreciated, the gear train 118, which may be variously configured and implemented, transfers drive torque from the drive shaft 116 to each of these accessories. The gear train 118 is also coupled to the starter-generator 106, an embodiment of which will now be described in more detail.

The starter-generator 106 includes a housing assembly 128, a motor-generator 132, and a lubricant pump 134. The housing assembly 128 is coupled to the gearbox 104 and includes a lubricant inlet port 136 for receiving a flow of lubricant. It will be appreciated that the lubricant may be supplied to the starter-generator 106 from any one of numerous non-illustrated lubrication sources.

The motor-generator 132 is disposed within the housing assembly 128 and is configured to selectively operate in either a motor mode or a generator mode. In the motor mode, the motor-generator 132 generates and supplies an output torque to the drive shaft 116 in response to being electrically energized. In the generator mode, the motor-generator 132 receives an input torque from the drive shaft 116 and generates electrical power. To implement this functionality, the motor-generator 132 includes a shaft 138, a rotor 142, and a stator 144. The shaft 138 is rotationally mounted within the housing assembly 128 via, for example, one or more bearing assemblies 146 (only one depicted), and is coupled to the gear train 118.

The rotor 142 is mounted on the shaft 138 and is configured to rotate therewith. The stator 144 is non-rotationally mounted within the housing assembly 128 and at least partially surrounds the rotor 142. In the motor mode, the stator 144 receives electrical power from a non-illustrated electrical power source, which causes the rotor 142, and thus the shaft 138, to rotate and supply an output torque. In the generator mode, the rotor 142 receives an input torque, via the shaft 138, and rotates, which induces electrical power in the stator 144. It will thus be appreciated that the motor-generator 132, when operating in the motor mode, may be used to start the gas turbine engine 102 and, when operating in the generator mode, may be used to supply electrical power.

The lubricant pump 134 is also disposed within the housing assembly 128, and includes one or more pump inlets 144, one or more pump outlets 146, and one or more pump elements 148. In the depicted embodiment, the lubricant pump 134 includes two pump inlets 144 (e.g., 144-1, 144-2), two pump outlets (e.g., 146-1, 146-2), and two pump elements 148 (e.g., 148-1, 148-2), with each pump element 148 including a pump element inlet and a pump element outlet. It will be appreciated that this number of inlets, outlets, and pump elements is merely exemplary, and that the lubricant pump 134 could be implemented with more or less than this number of inlets, outlets, and pump elements. It will additionally be appreciated that the lubricant pump may be implemented using any one of numerous types of suitable pumps. In the depicted embodiment, the lubricant pump comprises a positive displacement pump.

No matter its specific configuration and implementation, the lubricant pump 134 is coupled to the motor-generator 132, and more specifically to the rotor 142, via the shaft 138. The lubricant pump 134 is configured, upon rotation of the rotor 142, to draw lubricant into the one or more pump inlets 144 and discharge lubricant out of the one or more pump outlets 146. It is noted that the lubricant that is supplied to the lubricant inlet port 136 is supplied to at least the one or more bearing assemblies 146 and to at least the stator 144. The lubricant, as may be appreciated, is used to lubricate the one or more bearing assemblies 146, and to cool the stator 144. Thus, the lubricant pump 134 is used to scavenge the lubricant that is supplied to these lubricant loads, and return the scavenged lubricant to the one or more non-illustrated lubricant sources.

The scavenged lubricant that is discharged from the lubricant pump 134 may include various types of debris. Thus, the scavenged lubricant is preferably filtered before it is returned to the one or more non-illustrated lubricant sources. In the depicted embodiment, a filter housing 152 is coupled to the housing assembly 128 and includes a filter inlet 154, a filter outlet 156, and a replaceable lubricant filter 158. The filter inlet 154 is in fluid communication with the one or more pump outlets 146 to receive the scavenged lubricant discharged from the lubricant pump 134, and the filter outlet 156 is in fluid communication with the one or more lubricant sources. The lubricant filter 158 is disposed within the filter housing 152 between the filter inlet 154 and the filter outlet 156 and filters the lubricant supplied to the filter inlet 154. In the depicted embodiment, the filter housing 152 is coupled to the housing assembly 128 via a filter interface that is cast as part of the housing assembly 128.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system, comprising:
    a gas turbine engine including a rotationally mounted drive shaft; and
    a starter-generator coupled to the gas turbine engine, the starter-generator comprising:
        a housing assembly coupled to the gas turbine engine and including a lubricant inlet port for receiving a flow of lubricant;
        a motor-generator disposed within the housing assembly and configured to be supplied with at least a portion of the lubricant supplied to the lubricant inlet port, the motor-generator coupled to the drive shaft and comprising a shaft, a rotor, and a stator, the shaft rotationally mounted in the housing and coupled to the drive shaft, the rotor mounted on the shaft and configured to rotate therewith, the stator non-rotationally mounted within the housing assembly and at least partially surrounding the rotor, the motor-generator further configured to selectively operate in either a motor mode, in which the motor-generator generates and supplies an output torque to the drive shaft in response to being electrically energized, and a generator mode, in which the motor-generator receives an input torque from the drive shaft and generates electrical power;
        one or more bearing assemblies disposed within the housing assembly and rotationally mounting the shaft therein; and
        a lubricant pump disposed within the housing assembly for scavenging at least a portion of the lubricant supplied to the lubricant inlet port and including a plurality of pump inlets and a plurality of pump outlets, the lubricant pump directly connected to and driven by the shaft of the motor-generator and configured, upon rotation of the shaft of the motor-generator, to draw at least a portion of the lubricant supplied to the lubricant inlet port into the a plurality of pump inlets and discharge scavenged lubricant out of the a plurality of pump outlets,
        wherein the lubricant supplied to the lubricant inlet port is supplied to at least (i) the one or more bearing assemblies for lubrication thereof and (ii) the stator for cooling thereof.

2. The system of claim 1, further comprising: a filter interface cast as part of the housing assembly; and a filter housing coupled to the housing assembly via the filter interface and including a filter inlet and a filter outlet, the filter inlet in fluid communication with the plurality of pump outlets to receive lubricant discharged therefrom.

3. The system of claim 2, further comprising:
    a lubricant filter disposed within the filter housing between the filter inlet and the filter outlet.

4. The system of claim 1, wherein the lubricant pump comprises a positive displacement pump.

5. The system of claim 1, wherein the lubricant pump comprises a plurality of pump elements, each pump element including a pump element inlet and a pump element outlet.

6. The system of claim 1, further comprising:
    a gearbox disposed between, and coupled to, the gas turbine engine and the motor-generator.

7. A system, comprising:
    a gas turbine engine including a rotationally mounted drive shaft;
    a starter-generator coupled to the gas turbine engine; and
    a gearbox disposed between, and coupled to, the gas turbine engine and the starter-generator, wherein the starter-generator comprises:
        a housing assembly coupled to the gearbox and including a lubricant inlet port for receiving a flow of lubricant;
        a motor-generator disposed within the housing assembly and configured to be supplied with at least a portion of the lubricant supplied to the lubricant inlet port, the motor-generator coupled to the drive shaft and comprising a shaft, a rotor, and a stator, the shaft rotationally mounted in the housing and coupled to the drive shaft, the rotor mounted on the shaft and configured to rotate therewith, the stator non-rotationally mounted within the housing assembly and at least partially surrounding the rotor, the motor-generator further configured to selectively operate in either a motor mode, in which the motor-generator generates and supplies an output torque to the drive shaft in response to being electrically energized, and a generator mode, in which the motor-generator receives an input torque from the drive shaft and generates electrical power;
        a lubricant pump disposed within the housing assembly for scavenging at least a portion of the lubricant supplied to the lubricant inlet port and including a plurality of pump inlets and a plurality of pump outlets, the lubricant pump directly connected to and driven by the shaft of the motor-generator and configured, upon rotation of the shaft of the motor-generator, to draw at least a portion of the lubricant supplied to the lubricant inlet port into the one or more a plurality of pump inlets and discharge scavenged lubricant out of the one or more a plurality of pump outlets;
        one or more bearings disposed within the housing assembly and rotationally mounting the shaft therein;
        a filter interface cast as part of the housing assembly; and
        a filter housing coupled to the housing assembly via the filter interface and including a filter inlet and a filter outlet, the filter inlet in fluid communication with the plurality of pump outlets to receive lubricant discharged therefrom,
wherein the lubricant supplied to the lubricant inlet port is supplied to at least (i) the one or more bearing assemblies for lubrication thereof and (ii) the stator for cooling thereof.

8. The system of claim 7, wherein the lubricant pump comprises a positive displacement pump.

9. The system of claim 7, wherein the lubricant pump comprises a plurality of pump elements, each pump element including a pump element inlet and a pump element outlet.

* * * * *